April 29, 1930.  M. PEELEN  1,756,208
TEACHING DEVICE
Filed March 12, 1928
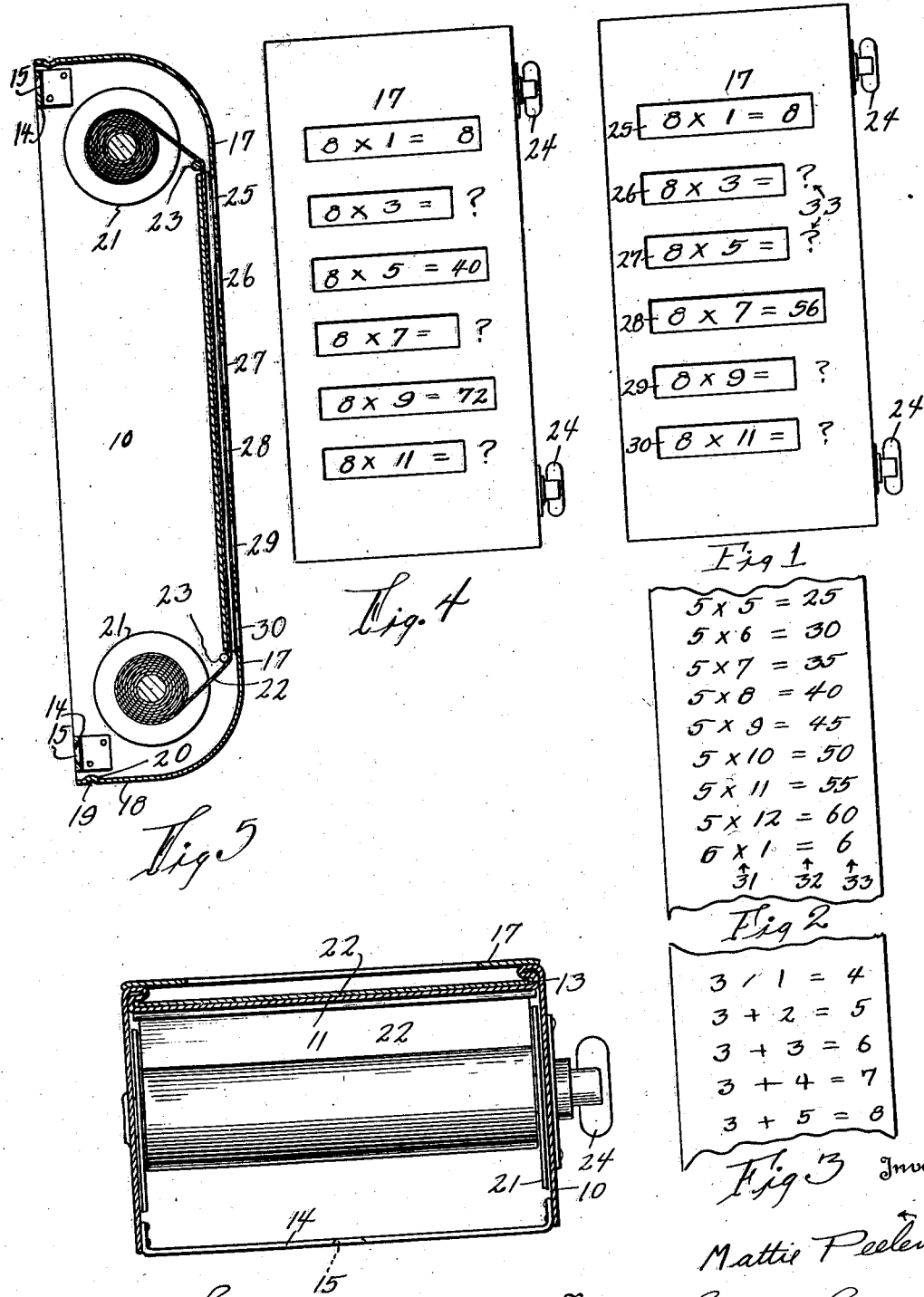

Patented Apr. 29, 1930

1,756,208

UNITED STATES PATENT OFFICE

MATTIE PEELEN, OF SANBORN, IOWA

TEACHING DEVICE

Application filed March 12, 1928. Serial No. 261,074.

My invention relates to a teaching device, particularly for use in connection with teaching the multiplication and addition tables.

My invention has to do with that type of device employing a ribbon, wound upon a pair of spools and adapted to be displayed through a series of sight openings.

The fundamental object of my invention is to provide a device adapted to display problems in a regular order, each of the problems being displayed the same number of times, but not in direct succession, the order of displaying problems of a particular series being so broken up, that the pupil is forced to rely entirely upon memory in giving the answers to the problems.

This object is accomplished by a simple arrangement of sight openings, whereby a particular problem is first displayed, then concealed, and then displayed again.

A further object is to provide a device which will present six new problems each time one shift of the ribbon is made.

A further object is to provide a device which, although it does not present problems in succession, will present them in such a progressive order that the teacher may easily remember which problems will be displayed in successive shifts of the ribbon without looking at the device, the teacher being thereby enabled to face her class.

A further object is to provide a device in which the order of presenting problems is such that a problem will first be displayed with the answer, then concealed, and then displayed without the answer, then at a later period displayed again with the answer, whereby the help or visual memory may be employed in impressing the answers to the problems upon the mind of the pupil.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Fig. 1 is a plan view of the device of my invention, employed as a multiplication tables teacher.

Fig. 2 is a plan view of a portion of the ribbon of the device, shown in Fig. 1.

Fig. 3 is a plan view of a ribbon which may be used when the device is employed as an addition tables teacher.

Fig. 4 is a plan view of a somewhat modified form of my invention.

Fig. 5 is a longitudinal, central, sectional view through the device.

Fig. 6 is a transverse, central, sectional view through the device.

The mechanical features of the device of my invention are as follows: A box-like framework, channel shaped in cross section, has the side members 10 and the connecting web 11. The connecting web 11 is depressed below the sides of the side members 10 and the metal joining the web with the side members 10 is drawn inwardly at either side of the device, to form the guides 13 which receive the ribbon and hold it securely in place. The side members 10 are braced together by means of cross strips 14, which are provided with openings 15 to receive screws or the like, by means of which the device may be attached to a wall.

A cover 17 serves also as a screen and is provided with end walls 18, which are indented as at 19 to spring into the notches 20 in the side walls 10. The cover is thus securely held in place.

Spools 21 are journalled in the side members 10 and spaced substantially from the cover 17, the ribbon 24 being wound upon the spools 21 and thence passed over rollers 23, which are positioned in the plane of the web 11.

Each spool is provided with a key 24, by means of which it may be rotated.

Six sight openings are provided in the cover 17, which are indicated herein by the reference characters 25, 26, 27, 28, 29 and 30, in consecutive order from top to bottom of the device. The sight openings 25 and 28 are longer than the remainder of the sight openings. It will thus be noted that the openings are grouped as follows: A long opening is followed by two short openings, and then another long opening is followed by two more short openings. The problems are printed upon the ribbon 22 in consecutive order, for instance, as shown in Fig. 2, the multiplication table of fives will read in part as follows: 5×5=25, 5×6=30, 5×7=35, etc. It will be noted that the problems are grouped in one column, as at 31. The equal signs are grouped in another column, as at 33.

The columns 31 and 32 are disclosed by both the long and short openings, whereas the column 33 is disclosed only by the openings 25 and 28. In the position where the answers would appear opposite the problems disclosed through the short openings, were the latter long enough, question marks 34 are imprinted upon the cover 17.

The spaces between the sight openings are of the same width as the openings themselves.

It may now be noted that as the ribbon is moved in one direction, a particular problem will first be disclosed in the opening 25 with its answer then covered up between the openings 25 and 26, then disclosed again in the opening 26, with its answer covered, then again covered, then disclosed in the opening 28 with the answer. Thus the child is first given a visual image of the entire problem including the answer. The problem is then concealed and another problem is presented to the vision of the pupil. After having concentrated on this second problem, the first problem will again be presented to his attention in the opening 26, the answer being covered so that he must rely upon his memory to give the same. The problem will then be covered again and the second problem then disclosed in the opening 26, where the answer to this second problem must be given from memory.

In actual practice, the teacher presents a set of problems to view and calls upon one pupil to give the answers to all of those problems. The pupil will begin by reading the problem in the column 25, the only effect there being of seing and repeating the problem and its answer. The pupil's attention will then be directed to the opening 26 and he will be requested to give the answer to the problem appearing in that opening. After having tried this, he will be asked to give the answer to the problem appearing in the opening 27. He will then read the problem in the opening 28 and will then be called upon to give from memory the answers to the problems in the two remaining openings.

Where all of the problems in a given table are displayed consecutively, the pupil can arrive at the answer by adding on to the answer to the previous problem a sum equal to the number by which the multiplication is being done. For instance, in the table shown in Fig. 1, the pupil could arrive at an answer to the second problem, assuming it to be 8×2, by merely adding the sum 8 to the answer to the first problem. Where the second problem is concealed, however, this function of addition is not available for the solution of the next problem which is visible, namely, the third problem in order and the pupil finds it necessary to rely upon his memory for the answer.

The device is so arranged that one-half of the problems in a certain table will be simultaneously presented to view and the other half revealed by a single shift of the ribbon. This is attained, in addition to the function of mixing up the problems to enforce the use of memory. Furthermore, the problems are presented in a regular succession such that the teacher can readily remember just what problems will be displayed at a particular time without looking at the device. A glance will tell her when the ribbon has been moved enough to accomplish the next shift and she may then again return her attention to the class.

In practice, the ribbon will be continuously shifted in the same direction and only the problems in one table will be taken up at one time. The first pupil will give six answers, the second pupil will give six answers, the third pupil will give 5, the fourth will give 5, the fifth, four, etc. In this way, the duller pupils may be picked to give a full list of six problems in any particular table, while the brighter pupils may be limited to only a few.

The advantages of the device are thought to be obvious from the foregoing description, but may, for the sake of clearness, be summed up here. The device offers an excellent form of class drill, namely, drilling through the eye.

Secondly, as all of the answers are displayed twice during one trip of the ribbon, the answer is thus intermittently impressed upon the mind of the child between periods when the problem is presented to the child without the answer. This intermittent presenting of problem and then problem with its answer will rapidly impress the answer upon the mind of the pupil.

The items which constitute a table are studied out of their regular order, causing the child to think and making it impossible for the child to use the "addition" method of arriving at an answer.

The device is very convenient for the teacher in two particulars, one being that one shift of the ribbon will make six changes of problems and the other being that the teacher can face the children while using the device. Another advantage from the teacher's standpoint is the fact that no pointer is needed. In Fig. 4, I have shown a somewhat modified form of my invention, in which the answer is displayed three times and the problem without the answer is displayed only once between the times when the answer is displayed. The same principle of intermittent displaying of problem and answer, then problem without answer, is involved here, but I find the other form to be more efficient in the rapid teaching of the tables. As shown in Fig. 3, the same device may be used for teaching the addition tables.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a teaching device, a casing including a screen, a ribbon movable under said screen, problems with answers displayed on said ribbon, each problem and answer extending transversely of the ribbon's direction of movement, and the problems being arranged in equally spaced succession, the screen being provided with a sight opening constructed so as to reveal a problem and its answer simultaneously, and with another opening constructed so as to reveal a problem and conceal its answer, a web of material of substantially the same width as that of an opening being formed between the sight openings and adapted to conceal a problem and its answer, the spacing of the openings being twice that of the problems, whereby alternate problems may be simultaneously centered under the respective openings, and the problem between said alternate problems may be simultaneously concealed beneath the web, whereby as the ribbon is gradually moved in one direction, a particular problem and its answer may be first displayed, then fully concealed, and then the problem displayed with its answer hidden, and whereby first one pair of alternate problems may be displayed, and then a succeeding pair of alternate problems may be displayed while the pair just displayed is concealed.

2. In a teaching device, a casing including a screen, a ribbon movable under the screen, problems with answers displayed on said ribbon, each problem and answer extending transversely of the ribbon's direction of movement, and the problems being arranged in equally spaced succession, the screen being provided with two sets of sight openings each including an opening constructed so as to reveal a problem and to conceal its answer, and an opening constructed so, as to reveal a problem and its answer simultaneously, webs of material of substantially the same width as that of a sight opening being formed between the sight openings, each web being adapted to conceal a problem and its answer, the spacing of the openings being twice that of the problems, whereby alternate problems may be simultaneously centered under the respective openings, and the problems between said alternate problems may be simultaneously concealed beneath the webs, whereby as the ribbon, is gradually moved in one direction, a particular problem and its answer may be first displayed, then fully concealed, and then the problem displayed with its answer hidden, and whereby first one pair of alternate problems may be displayed, and then concealed while a succeeding pair of alternate problems is displayed.

3. In a teaching device, a casing including a screen, a ribbon movable under said screen, problems with answers displayed on said ribbon, each problem and answer extending transversely of the ribbon's direction of movement, and the problems being arranged in equally spaced succession, the screen being provided with a sight opening constructed so as to reveal a problem and its answer simultaneously, and with two succeeding openings each constructed so as to reveal a problem and to conceal its answer, webs of material of substantially the same width as that of an opening being formed between the sight openings and adapted each to conceal a problem and its answer, the spacing of the openings being twice that of the problems, whereby alternate problems may be simultaneously centered under the respective openings, and the problems between said alternate problems may be simultaneously concealed beneath the web, whereby as the ribbon is gradually moved in one direction, a particular problem and its answer may be first displayed, then fully concealed, and then the problem displayed with its answer hidden, and whereby first one pair of alternate problems may be displayed, and then a succeeding pair of alternate problems may be displayed while the pair just displayed is hidden.

Signed this 5th day of March, 1928, in the county of O'Brien and State of Iowa.

MATTIE PEELEN.